(12) United States Patent
Lewis

(10) Patent No.: US 6,418,813 B1
(45) Date of Patent: Jul. 16, 2002

(54) KICKDOWN MECHANISM FOR A PEDAL

(75) Inventor: John T. Lewis, Granger, IN (US)

(73) Assignee: CTS Corporation, Elkhart, IN (US)

( * ) Notice: Subject to any disclaimer, the term of this patent is extended or adjusted under 35 U.S.C. 154(b) by 32 days.

(21) Appl. No.: 09/711,830

(22) Filed: Nov. 13, 2000

(51) Int. Cl.[7] .................................................. G05G 5/06
(52) U.S. Cl. ............................... 74/527; 74/512; 74/514
(58) Field of Search ........................... 74/502.4, 802.6, 74/512, 513, 560, 527, 529, 531, 532, 534; 477/133, 136, 141

(56) References Cited

U.S. PATENT DOCUMENTS

| | | | | |
|---|---|---|---|---|
| 3,885,449 A | * | 5/1975 | Green ........................ | 74/512 |
| 5,416,295 A | | 5/1995 | White | |
| 5,634,379 A | * | 6/1997 | Barnard ..................... | 74/502.6 |
| 5,768,946 A | | 6/1998 | Fromer | |
| 5,934,152 A | * | 8/1999 | Aschoff et al. ............. | 74/513 |
| 6,134,987 A | * | 10/2000 | Kalsi .......................... | 74/560 |
| 6,167,778 B1 | * | 1/2001 | Kohlen ....................... | 74/513 |
| 6,179,081 B1 | * | 1/2001 | Engelgau ................... | 180/170 |
| 6,220,114 B1 | * | 4/2001 | Ray ............................ | 74/527 |

FOREIGN PATENT DOCUMENTS

| | | |
|---|---|---|
| EP | 0748713 A2 | 12/1996 |
| EP | 0670235 B1 | 8/1997 |
| EP | 0926581 A2 | 6/1999 |

* cited by examiner

Primary Examiner—David A. Bucci
Assistant Examiner—Timothy McAnulty
(74) Attorney, Agent, or Firm—Mark P. Bourgeois; Mark W. Borgman

(57) ABSTRACT

A kickdown mechanism provides a tactile feedback to the foot of a user depressing a vehicle pedal. The kickdown mechanism has a case and a plunger having a recess. The plunger is engaged by movement of the pedal so as to cause the plunger to travel linearly. A friction generating assembly is retained by the case and engages with the plunger so as to provide a tactile feedback to the user. The friction generating assembly has a rod that is retained by the case. The rod is biased into the recess such that the pedal, when depressed, urges the plunger from a first position in which the rod is located in the recess to a second position in which the rod is located outside the recess.

6 Claims, 3 Drawing Sheets

KICKDOWN MECHANISM FOR A PEDAL

CROSS REFERENCE TO RELATED AND CO-PENDING APPLICATIONS

This application is related to U.S. patent application Ser. No. 09/677,311, filed 09/29/2000 and entitled, "Electronic Accelerator Pedal having a Kickdown Feature", the contents of which are herein incorporated by reference.

BACKGROUND OF THE INVENTION

1. Field of the Invention

This invention pertains generally to vehicle pedals and more specifically to pedal structures cooperatively mated with electrical devices such as position sensors and to mechanisms that give the user a tactile feedback.

2. Description of the Related Art

Typical vehicle pedal cases are mechanical, typically incorporating a cable or various gears and other transmission devices to convert the limited rotary motion available from the pedal into useful mechanical motion. Other pedals incorporate some type of position sensor that converts the mechanical position into an electrical signal. In the field of automobiles and trucks, a mechanical bracket using a cable, often referred to as a Bowden cable, is the standard method for controlling the throttle of internal combustion engines. These pedal assemblies have a desirable feel and functionality and, with a few refinements, are extremely reliable. This type of pedal assembly defines the mechanical standard today.

As noted, through time there have been a number of attempts at different types of pedal devices to control machines. One major attempt has been to introduce an electrical linkage between the pedal and the device to be controlled. An electrical linkage is desirable since gear assemblies are bulky, expensive and limited due to their inherent size to those applications where the pedal is very close to the controlled device. Gear and other mechanical linkages are also prone to sticking or binding. While the Bowden cable has proved generally reliable, the penetration of moisture and other contaminants may still cause the cable to bind or freeze up during inclement weather.

A potentiometer is often used to sense the position of the accelerator pedal. This potentiometer is in some ways similar to the volume controls used in radio and television receivers. A voltage is applied across two extreme ends of a resistor. An intermediate tap is provided between the two extremes of the resistor. The tap is mechanically linked to the device which is to be sensed, and the position of the device is determined by the voltage at the intermediate tap.

There are several stringent requirements placed upon a pedal position sensor that make it different from a volume control. Since the pedal is used to measure a demand for power, binding of the pedal shaft in a position demanding power could result in life threatening situations. Safety and reliability are essential in automotive pedal applications.

The automotive environmental requirements are also different from a radio or television receiver. The pedal position sensor must reside in a dirty environment with widely varying temperatures. An operator may often bring large amounts of dirt or mud into the pedal region. Temperatures might, for example, range from –55 to +150 degrees Celsius. Further, the device may be exposed to a number of solvents and other adverse conditions associated with automotive environments. These requirements diverge greatly from the typical volume control.

In the prior art, levers or special mechanical drives were used to interface the electrical position sensor to the pedal. These drives ensured that, even in the event of some sensor malfunction, the pedal sensor would not retain the pedal in an acceleration position, but instead would allow the pedal to return to an idle stop. Engagement between the sensor and the pedal shaft then necessitated the use of a return spring so that as the pedal shaft returned to idle position, the pedal position sensor would also follow and track the position of the pedal.

The pedal position sensor in the prior art typically has been a freestanding, rather self-contained device. In addition to the return spring, a well-sealed package including the associated bearings is typically provided. Significant effort was directed at designing a package that was sealed against the adverse chemicals, dirt and moisture that might otherwise damage the sensor.

Variations in contact pressure, contact orientation, lube and other similar factors all impact the performance of the sensor. Further, field replacement is important for service repair, and the service replacement should be of the same quality as the original device. Failure to fully and completely package the sensor results in loss of precise control over lube thickness and composition, lost protection of vital components while shelved awaiting installation and during installation, and lost control over contactor and element relationships that are all desirable features.

Attempts at incorporating electrical sensors into pedals have had poor tactile feel for the operator. The pedal is no longer attached to any mechanical assembly like a cable that provides friction and resistance to overcome during operation. Since operators have become accustomed to the feel of a mechanical pedal, it is desirable to continue this feeling with electronic pedals.

One difficulty encountered with providing the feel of a mechanical pedal is that the mechanism to accomplish the feedback must be contained within a small area inside the pedal. This leads to problems with packaging, abrasion and strength of material issues with the kickdown mechanism that provides a tactile feedback to the user. The present invention seeks to overcome the limitations of the prior art and offer a kickdown mechanism that delivers outstanding ergonomics for the pedal operator in small package that is reliable.

3. Related Art

Examples of patents that are related to the present invention are as follows, and each patent is herein incorporated by reference for the supporting teachings:

U.S. Pat. No. 5,768,946 is a pedal with integrated position sensor.

U.S. pat. No. 5,416,295 is a combined pedal force switch and position sensor.

EPO patent publication no. EP 926581 A2 is an accelerator pedal installation.

EPO patent publication no. EP 748713 A2 is an accelerator pedal installation.

EPO patent publication no. EP 670235 A1 is an accelerator pedal installation.

The foregoing patents reflect the state of the art of which the applicant is aware and are tendered with the view toward discharging the applicant's acknowledged duty of candor in disclosing information which may be pertinent in the examination of this application. It is respectfully stipulated, however, that none of these patents teach or render obvious, singly or when considered in combination, the applicants claimed invention.

SUMMARY OF THE INVENTION

It is a feature of the invention to provide a reliable and cost-effective kickdown mechanism for electronic accelerator pedals for motor vehicles.

An additional feature of the invention is to provide a kickdown mechanism for a pedal providing a tactile feedback to a foot of a user. The kickdown mechanism includes a case and a plunger having a recess. The plunger is engaged by movement of the pedal so as to cause the plunger to travel linearly. A friction generating assembly is retained by the case and engages with the plunger so as to provide a tactile feedback to the user. The kickdown mechanism includes the plunger having a first and second end. The first end is located within the case and the second end extends from the case. A first spring biases the plunger outwardly from the case. The friction generating assembly includes a rod that is retained by the case. A second spring biases the rod into the recess such that the pedal, when depressed, urges the plunger from a first position in which the rod is located in the recess to a second position in which the rod is located outside the recess.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
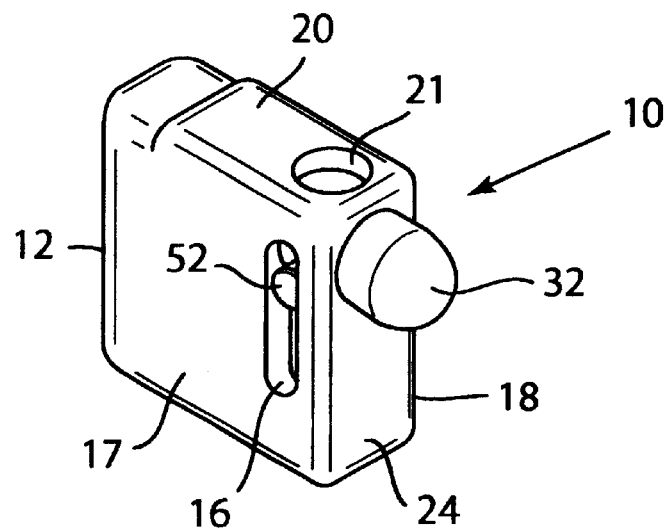
FIG. 1 is a perspective view of the assembled kickdown mechanism.
Figure 2:
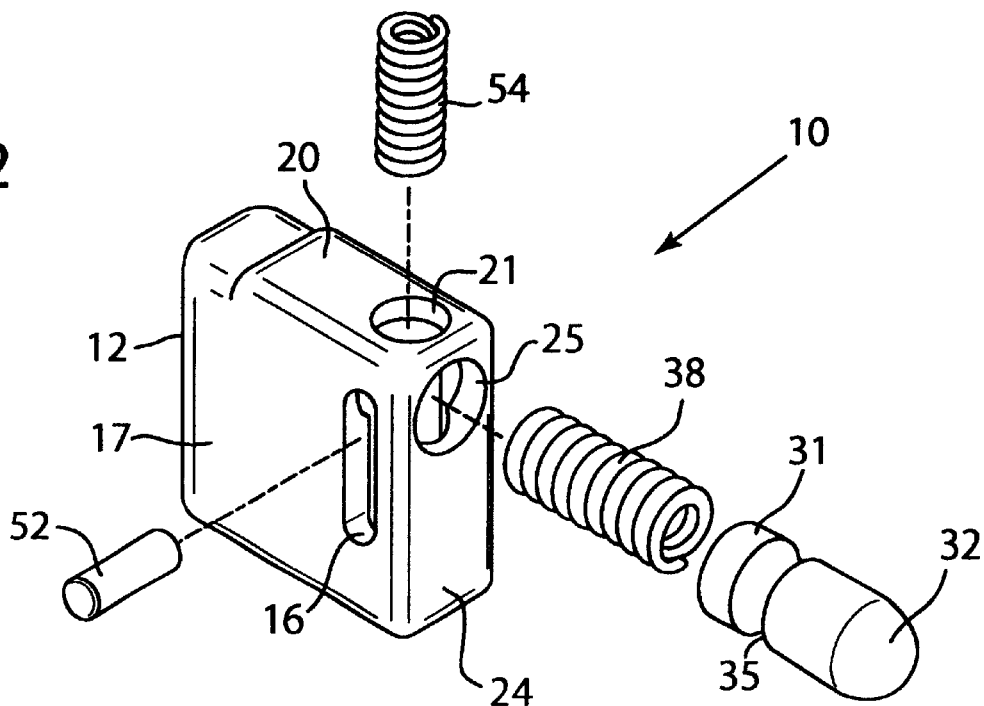
FIG. 2 is an exploded perspective view of FIG. 1.
Figure 3:
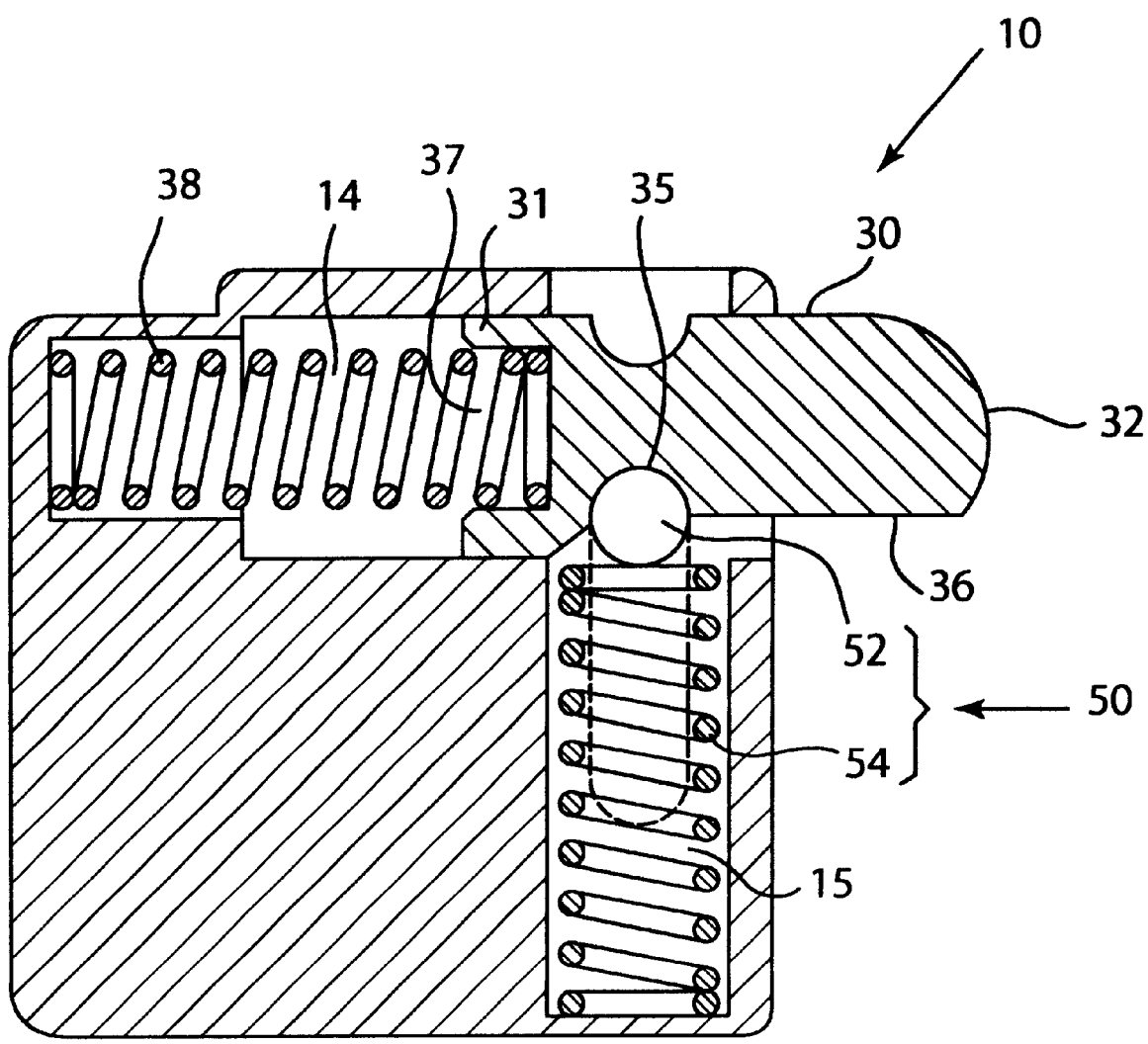
FIG. 3 is a side cross sectional view of FIG. 1 along line A—A.

It is noted that the drawings of the invention are not to scale.

DETAILED DESCRIPTION OF THE PREFERRED EMBODIMENTS

Referring to FIGS. 1–4, there is a kickdown mechanism 10 shown. Kickdown mechanism 10 provides a tactile feedback to the foot of a user depressing a pedal. The kickdown mechanism 10 has a case 12. Case 12 is formed of machined steel and has a plunger bore 14 and a rod bore 15 on the inside of case 12. A pair of slots 16 are formed onto sides 17 and 18. Top surface 20 has an aperture 21 and front surface 24 has an aperture 25. A plunger 30 has two ends, 31 and 32. End 32 is rounded. A recess 35 is located in plunger 30 about in the middle on a bottom surface 36. A bore 37 is located in end 31. End 31 is located within the case and end 32 extends from the case. A coil spring 38 is located in plunger bore 14 and biases the plunger outwardly from the case. The plunger is engaged by movement of the pedal so as to cause the plunger to travel linearly. A drive plate 102 shown in FIG. 4 engages end 32 when the pedal (not shown) is depressed far enough.

A friction generating assembly 50 is retained by the case 12 and engages with the plunger so as to provide a tactile feedback to the user. The friction generating assembly includes a rod 52 that is retained by slots 16. Coil spring 54 biases rod 52 into recess 35.

Figure 4:
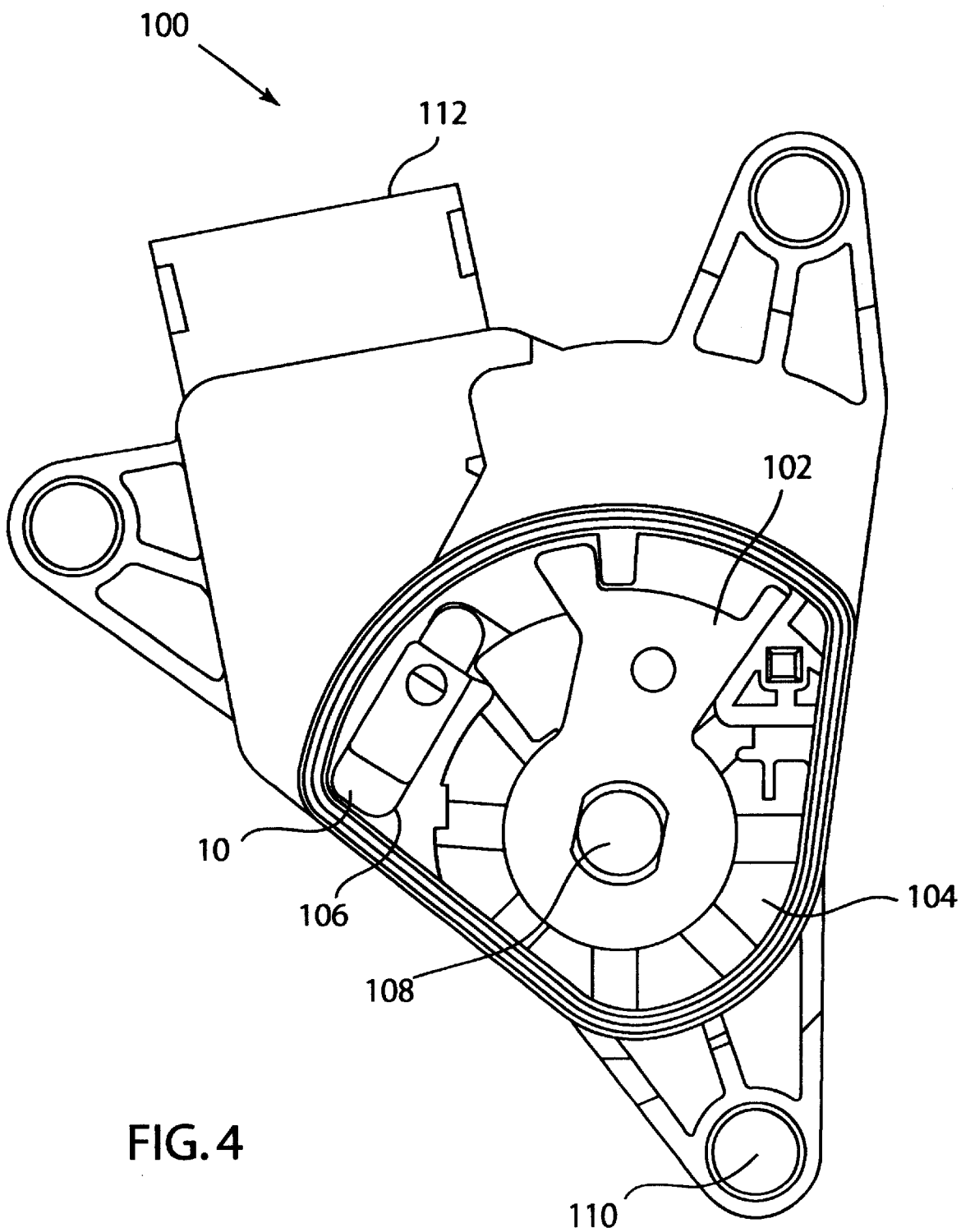
FIG. 4 is a side view of the kickdown mechanism mounted in a pedal and sensor housing.

Referring to FIG. 4, a pedal and sensor housing 100 is shown. Housing 100 has a cavity 104 that contains a drive plate 102 and a kickdown mechanism 10. Kickdown mechanism 10 is retained in another cavity 106. Cavity 106 contains the bottom half of case 12. Drive plate 102 is attached to a shaft 108. The other end of shaft 108 is attached to a pedal (not shown) that is depressed by the foot of a user. A cover (not shown) would seal cavity 104. Mounting holes 110 mount housing 100 to a bracket that is attached to the bulkhead of a vehicle. A connector shroud 112 is used to attach a wire harnes (not shown). The wire harness is used to electrically connect with the sensor part of housing 100 that is more fully described in the parent patent application.

In operation, the pedal, when depressed, causes drive plate 102 to move toward plunger 30. Further depression of the pedal causes drive plate 102 to come into contact with end 32. Further depression of the pedal causes drive plate 102 to urge the plunger 35 from a position in which rod 52 is located in recess 35 to a position in which rod 52 is located outside the recess along surface 36. As the plunger changes position, spring 54 is compressed causing rod 52 to drop down. At the same time spring 38 is compressed. The engagement of the plunger with the rod provide a tactile feedback to the foot of the user that the pedal has been depressed a certain distance.

Variations of the Preferred Embodiment

The pedal assembly shown used a coil spring, one skilled in the art will realize that the preferred embodiment would work with other types of springs. For example, leaf springs could be used.

Although the pedal assembly was shown with a single kickdown mechanism, it is contemplated to provide more than one kickdown mechanism. If additional tactile feedback points are desired.

While the invention has been taught with specific reference to these embodiments, someone skilled in the art will recognize that changes can be made in form and detail without departing from the spirit and the scope of the invention. The scope of the invention is, therefore, indicated by the appended claims rather than by the foregoing descriptions. All changes which come within the meaning and range of equivalency of the claims are to be embraced within their scope.

What is claimed is:

1. A kickdown mechanism for a pedal providing a tactile feedback to a foot of a user comprising:
   a) a case;
   b) a plunger having a recess and a first and second end, the first end disposed within the case, the second end extending from the case;
   c) a first spring biasing the plunger outwardly from the case;
   d) a rod retained by the case; and
   e) a second spring biasing the rod into the recess such that the pedal, when depressed, urges the plunger from a first position in which the rod is located in the recess to a second position in which the rod is located outside the recess.

2. The kickdown mechanism according to claim 1, wherein the case has a pair of slots in which the rod is retained, the slots allowing the rod to travel in and out of the recess.

3. The kickdown mechanism according to claim 2, wherein the mechanism is mounted in a pedal housing.

4. A kickdown mechanism for a pedal providing a tactile feedback to a foot of a user comprising:
   a) a case;
   b) a plunger having a recess, the plunger engagable by movement of the pedal so as to cause the plunger to travel linearly;
   c) a friction generating assembly retained by the case and engagable with the plunger, so as to provide a tactile feedback to the user, the friction generating assembly including:
   c1) the plunger having a first and second end, the first end disposed within the case, the second end extending from the case;
   c2) a first spring biasing the plunger outwardly from the case
   c3) a rod retained by the case; and
   c4) a second spring biasing the rod into the recess such that the pedal, when depressed, urges the plunger from a first position in which the rod is located in the recess to a second position in which the rod is located outside the recess.

5. The kickdown mechanism according to claim 4, wherein the case has a pair of slots in which the rod is retained, the slots allowing the rod to travel in and out of the recess.

6. The kickdown mechanism according to claim 4, wherein the mechanism is mounted in a pedal housing.

* * * * *